United States Patent
Ito et al.

(10) Patent No.: US 7,162,400 B2
(45) Date of Patent: Jan. 9, 2007

(54) SIMULATION METHOD, SIMULATION PROGRAM, AND SEMICONDUCTOR DEVICE MANUFACTURING METHOD EACH EMPLOYING BOUNDARY CONDITIONS

(75) Inventors: Sanae Ito, Kanagawa-ken (JP); Hirotaka Amakawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 744 days.

(21) Appl. No.: 10/028,319

(22) Filed: Dec. 28, 2001

(65) Prior Publication Data

US 2002/0087298 A1    Jul. 4, 2002

(30) Foreign Application Priority Data

Dec. 28, 2000  (JP) ............................ P2000-402778

(51) Int. Cl.
*G06F 17/50* (2006.01)
(52) U.S. Cl. ............................ 703/13; 703/14; 438/10; 438/379; 257/98
(58) Field of Classification Search ................ 703/13, 703/14; 716/21; 438/10; 257/98
See application file for complete search history.

(56) References Cited

U.S. PATENT DOCUMENTS

| | | | | |
|---|---|---|---|---|
| 5,684,723 A * | 11/1997 | Nakadai ...................... 716/20 |
| 5,699,271 A * | 12/1997 | Sagawa et al. ............... 716/20 |
| 5,821,911 A * | 10/1998 | Jachimowicz .................. 345/7 |
| 5,889,680 A * | 3/1999 | Yokota .......................... 703/4 |
| 6,099,574 A * | 8/2000 | Fukuda et al. ............... 703/14 |
| 6,192,330 B1 * | 2/2001 | Nakamura ................... 703/13 |
| 6,304,834 B1 * | 10/2001 | Enda ............................ 703/4 |
| 6,429,418 B1 * | 8/2002 | Chahl et al. ................ 250/216 |
| 6,505,147 B1 * | 1/2003 | Kumashiro .................... 703/2 |
| 6,665,849 B1 * | 12/2003 | Meuris et al. ................ 716/7 |
| 2002/0100005 A1 * | 7/2002 | Anderson et al. .............. 716/5 |
| 2003/0227415 A1 * | 12/2003 | Joannopoulos et al. ..... 343/754 |
| 2004/0015808 A1 * | 1/2004 | Pang et al. ................... 716/19 |
| 2004/0081398 A1 * | 4/2004 | Jette et al. .................... 385/37 |
| 2004/0092061 A1 * | 5/2004 | Kawasaki et al. .......... 438/166 |
| 2005/0161662 A1 * | 7/2005 | Majumdar et al. ........... 257/18 |
| 2006/0009751 A1 * | 1/2006 | Zvuloni et al. ............... 606/20 |
| 2006/0081062 A1 * | 4/2006 | Silverbrook et al. .......... 73/754 |

FOREIGN PATENT DOCUMENTS

JP    2-222159    9/1990

(Continued)

OTHER PUBLICATIONS

"Two-Dimensional Process Simulation Program", Avant!, TSUPREM-4, User's Manual, Version 1999.2, Jun. 1999, (5 pages).

(Continued)

*Primary Examiner*—Kamini Shah
*Assistant Examiner*—Kibrom Gebresilassie
(74) *Attorney, Agent, or Firm*—Oblon, Spivak, McClelland, Maier & Neustadt, P.C.

(57) ABSTRACT

An aspect of the present invention provides a method of carrying out a simulation with simulation data, including, determining whether or not the simulation data includes boundary conditions set for a boundary of a calculation area set for the simulation, computing the influence of the boundary conditions on the inside of the calculation area if the simulation data includes the boundary conditions, displaying the influence of the boundary conditions on the inside of the calculation area, prompting to enter an instruction whether or not the boundary conditions are changed, and if an instruction to make no change in the boundary conditions is entered, carrying out the simulation with the simulation data.

13 Claims, 9 Drawing Sheets

FOREIGN PATENT DOCUMENTS

| | | | |
|---|---|---|---|
| JP | 03-247342 | * | 9/1993 |
| JP | 08-282456 | * | 5/1998 |
| JP | 10125612 | * | 5/1998 |
| JP | 11-176707 | | 7/1999 |
| JP | 2000-267890 | | 9/2000 |

OTHER PUBLICATIONS

"Two-Dimensional Device Simulation Program", Avant Medici, User's Manual, Version 1999.2, Jul. 1999, (4 pages).

Naoyuki Shigyo, et al., "The Influence of Boundary Locations on Wiring Capacitance Simulation", IEEE Transactions on Electron Devices, vol. 36, No. 6, Jun. 1989, pp. 1171-1174.

* cited by examiner

SIMULATION METHOD, SIMULATION PROGRAM, AND SEMICONDUCTOR DEVICE MANUFACTURING METHOD EACH EMPLOYING BOUNDARY CONDITIONS

CROSS REFERENCE TO RELATED APPLICATIONS

This application is based upon and claims benefit of priority from the prior Japanese Patent Application No. P2000-402778 filed on Dec. 28, 2000, the entire contents of which are incorporated by reference herein.

BACKGROUND OF THE INVENTION

1. Field of the Invention

The present invention relates to a simulation method, a simulation program, and a semiconductor device manufacturing method. In particular, the present invention relates to a technique of simulating semiconductor device processes employing to boundary conditions.

2. Description of the Related Art

A simulation of the manufacturing processes or electric characteristics of a semiconductor device is usually restricted by various conditions such as a computation time and a computer memory capacity. To comply with the restrictions, the simulation is carried out by setting a finite calculation area. Especially, a simulation involving three-dimensional calculations needs a larger memory capacity and a longer computation elapse time than a simulation involving two-dimensional calculations, and therefore, is usually allocated with a narrow calculation area. Setting a finite calculation area for a simulation is achieved by setting boundary conditions on the boundary of the finite calculation area.

The boundary conditions influence a simulation result. This influence of the boundary conditions is often overlooked by a design engineer, and the design engineer is frequently unaware of a deviation in a simulation result from a true result to be derived from the simulation on the calculation area. When relatively simple boundary conditions such as mirror, fixed, or periodic boundary conditions are improper for a given simulation, it is difficult to choose proper boundary conditions for the simulation. If improper boundary conditions are set for the simulation, an unintended simulation result will be obtained. If the unintended simulation result is passed unnoticed to design a semiconductor device, it leads to a failure of the semiconductor device.

SUMMARY OF THE INVENTION

An aspect of the present invention provides a method of carrying out a simulation with simulation data, including, determining whether or not the simulation data includes boundary conditions set for a boundary of a calculation area set for the simulation, computing the influence of the boundary conditions on the inside of the calculation area if the simulation data includes the boundary conditions, displaying the influence of the boundary conditions on the inside of the calculation area, prompting to enter an instruction whether or not the boundary conditions are changed, and if an instruction to make no change in the boundary conditions is entered, carrying out the simulation with the simulation data.

Another aspect of the present invention provides a semiconductor device manufacturing method, comprising, designing a semiconductor device, outputting design data of the semiconductor device, simulating the design data of the semiconductor device employing a simulation data in connection with the semiconductor device, the simulating including, determining whether or not the simulation data includes boundary conditions set for a boundary of a calculation area set for the simulation, computing the influence of the boundary conditions on the inside of the calculation area if the simulation data includes the boundary conditions, displaying the influence of the boundary conditions on the inside of the calculation area, prompting to enter an instruction whether or not the boundary conditions are changed, and if an instruction to make no change in the boundary conditions is entered, carrying out the simulation with the simulation data, and fabricating the semiconductor device according to the design data.

DETAILED DESCRIPTION OF EMBODIMENTS

Figure 1:
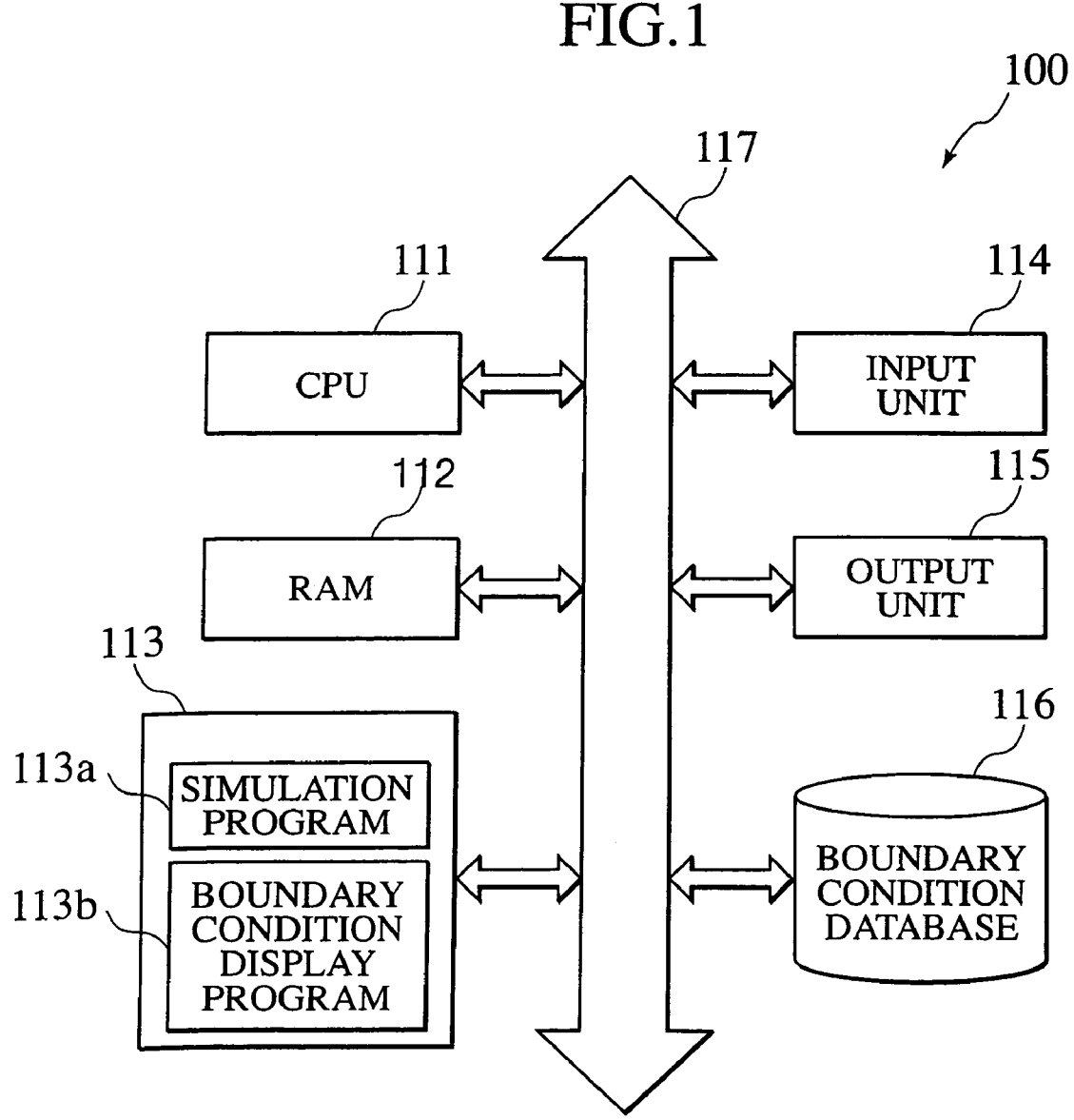
FIG. 1 is a block diagram showing a simulation system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

The present invention is applicable to, for example, process simulations and device simulations carried out to design a semiconductor device. A term "simulation" includes process simulation and device simulation in this specification. Also an apparatus used to carry out the process simulations and device simulations is called a simulation system in this specification.

(Simulation System)

FIG. 1 is a block diagram showing a simulation system 100 according to an embodiment of the present invention. The simulation system 100 has a CPU 111, a RAM 112, a memory 113, an input unit 114, an output unit 115, a boundary condition database 116, and a bus 117. Through the bus 117, the CPU 111 reads programs from the memory 113, to carry out various control operations according to instructions written in the programs. The RAM 112 secures a work area to temporarily store programs and data related to processes executed by the CPU 111. The memory 113 stores, for example, a simulation program 113*a* and a boundary condition display program 113*b*. The memory 113 may include magnetic, optical, and semiconductor storage media that are readable by the simulation system 100. Programs and data to be stored in such storage media may partly or wholly be transferred to the simulation system 100 from a remote location through a transmission medium such as an electronic network.

Figure 9:
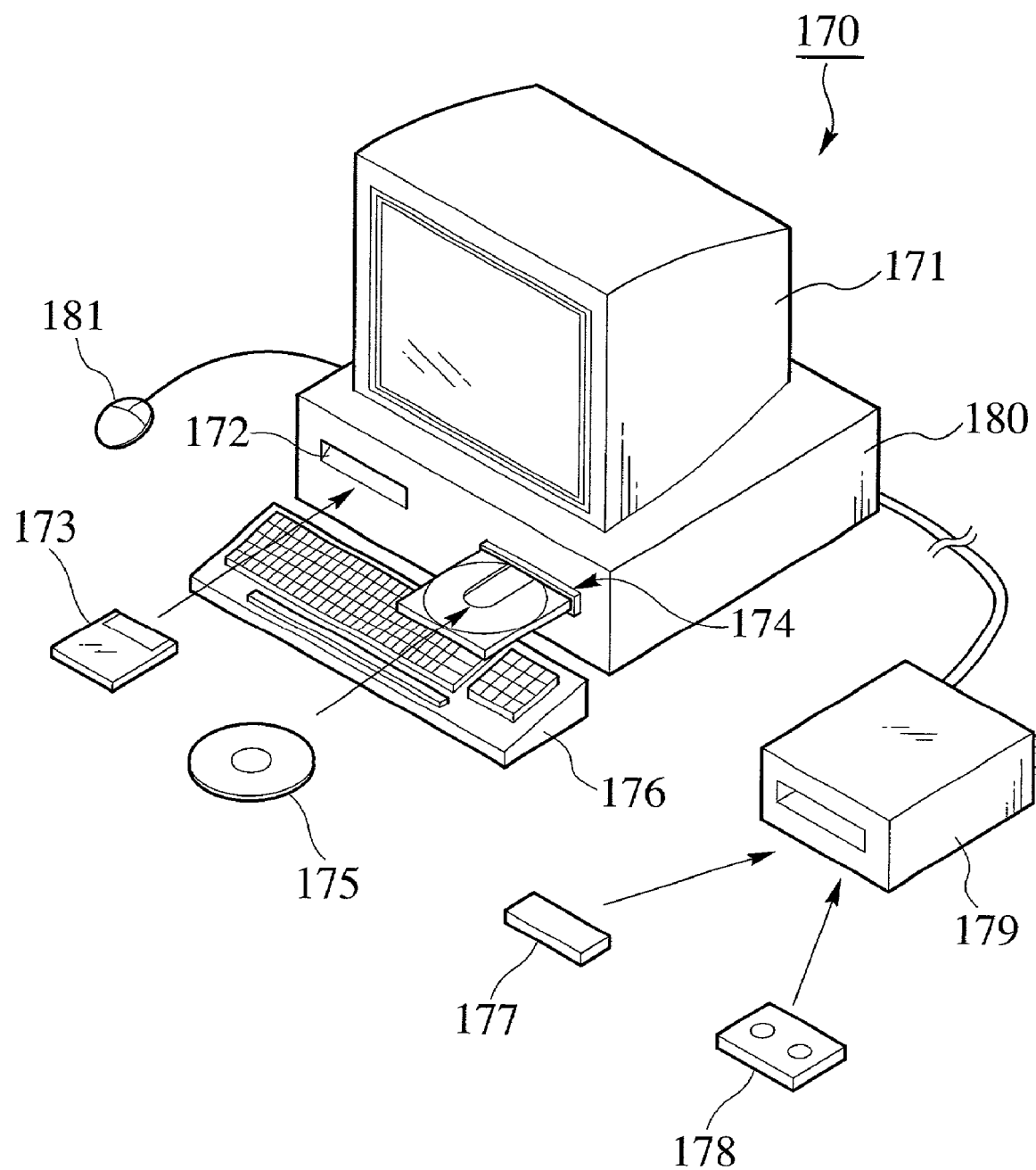
FIG. 9 is a perspective view showing a simulation system according to an embodiment of the present invention.

FIG. 9 is a perspective view showing an example of a computer system 170 that materializes the simulation system 100. The system 170 has a main body 180. The main body 180 is connected to a display 171, a keyboard 176, and a mouse 181. The main body 180 incorporates an FD (floppy disk) drive 172 to read an FD 173 and a CD (compact disk) drive 174 to read a CD 175. The drive 174 may be a DVD (digital video disk) drive to read a DVD 175. The system 170 may be connected to an external drive 179 to read an external memory 177 or a tape 178 such as a DAT. The FD 173, CD 175, external memory 177, and tape 178 are computer-readable storage media storing simulation programs, etc., according to the present invention. The programs are installed in and executed by the system 170, to carry out simulations according to the present invention.

Returning to FIG. 1, the input unit 114 is used to enter various data related to simulations into the simulation system 100. The received data are transferred to the CPU 111, RAM 112, memory 113, etc. The input unit 114 includes, for example, a ten-key pad, a keyboard, and a mouse. The output unit 115 is used to output data related to simulations. The output unit 115 includes, for example, a display and a printer. The database 116 stores various boundary conditions that are retrievable and editable. The boundary conditions stored in the database 116 are, for example, mirror boundary conditions, fixed boundary conditions, periodic boundary conditions, computation accuracies, computation times, and reference documents. A user may retrieve necessary data from the database 116 and set proper boundary conditions for a simulation to carry out.

(Simulation Method)

Figure 2:
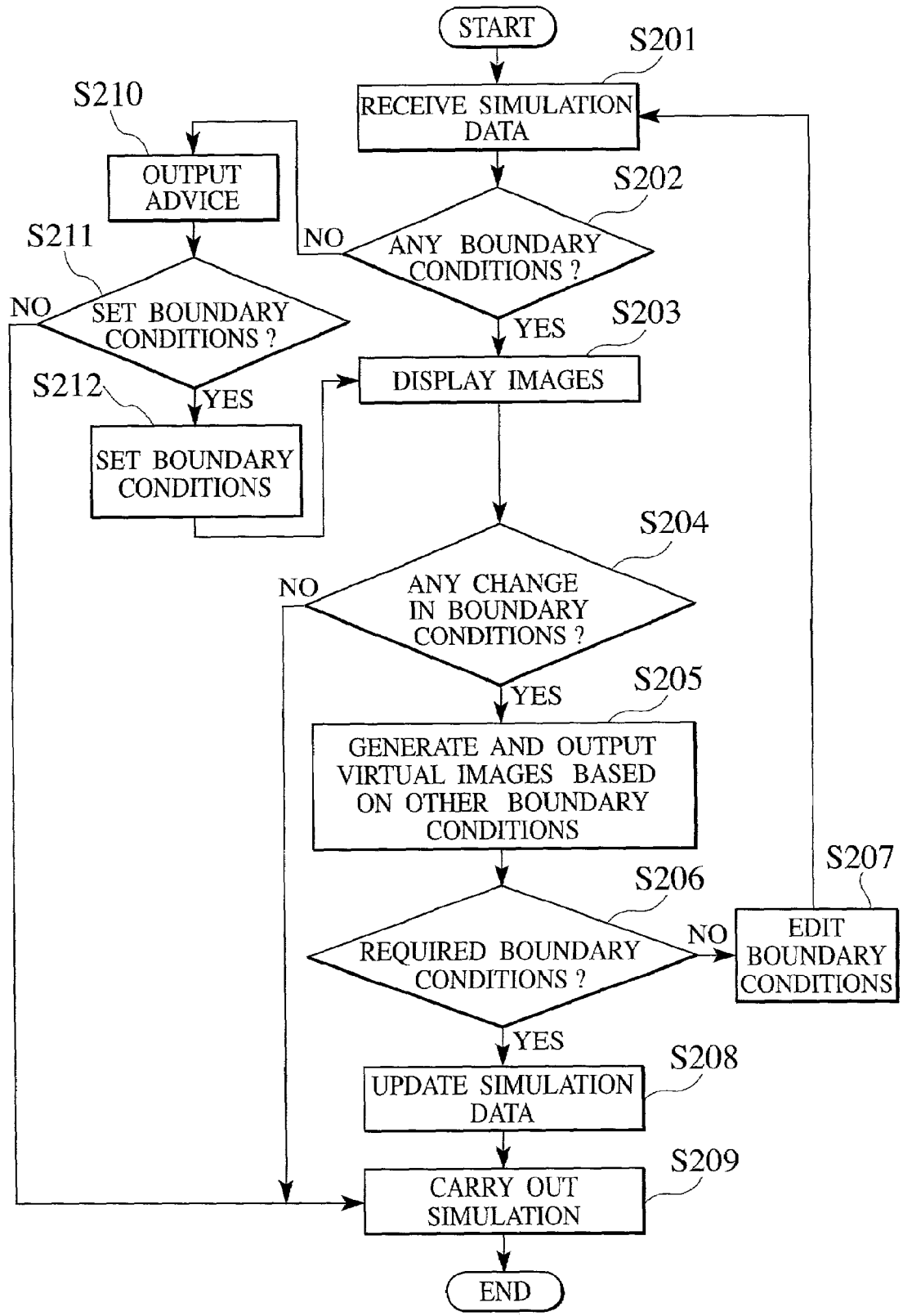
FIG. 2 is a flowchart showing a simulation method according to an embodiment of the present invention.

FIG. 2 is a flowchart showing a simulation method according to an embodiment of the present invention. This method is achieved by the simulation system of FIG. 1. In step S201, the simulation system receives simulation data using the input unit 114 (FIG. 1), to start a simulation. The CPU 111 reads the simulation program 113*a* and boundary condition display program 113*b* from the memory 113 and stores them in the RAM 112. According to the programs, the CPU 111 executes processes explained below. Although the programs 113*a* and 113*b* are independent of each in this embodiment, they may be integrated into one by, for example, including the codes of the program 113*b* in the program 113*a*. The simulation data received in step S201 relates to a semiconductor device to simulate and may include boundary conditions. Step S202 checks to see if the received simulation data includes boundary conditions. If boundary conditions are included, step S203 is carried out.

If no boundary conditions are included in the simulation data, the CPU 111 outputs, in step S210, a message indicating there are no boundary conditions. This message may be accompanied by recommended boundary conditions. Step S211 asks the user whether or not boundary conditions must be set. If the user determines that boundary conditions must be set, the user edits the simulation data and sets boundary conditions in step S212. Thereafter, step S203 is carried out. If the user determines that no boundary conditions are needed, step S209 carries out a simulation according to the received simulation data.

According to the boundary conditions found in step S202 or set in step S212, step S203 executes the boundary condition display program 113*b* to generate real images in a calculation area set by the user and virtual images outside the calculation area and provides the generated images to the output unit 115.

Figure 3A:
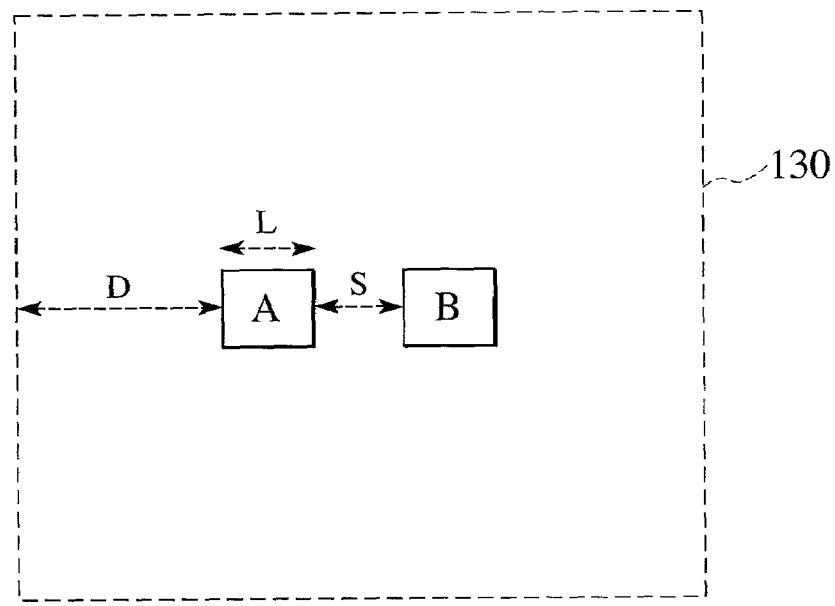
FIG. 3A explains boundary conditions.

The operations carried out in step S203 will be explained in detail. To compute, for example, a wire-to-wire capacitance value, two-dimensional calculations in a wire crossing direction are carried out if a wire length is sufficiently long. FIG. 3A explains boundary conditions set for a boundary that defines a calculation area 130 to compute a wire-to-wire capacitance value. In the calculation area 130, cross-sections of two wires A and B are shown. Each wire has a side length L, and the wires A and B are spaced apart from each other by a distance S. The outside of the calculation area 130 is a non-calculation area. The calculation area 130 extends from the wire A by a sufficiently long distance D. To calculate the capacitance value, a small potential dV is applied to the wire B and a charge quantity Q generated in the wire A is measured. Then, the capacitance value C is calculated as C=Q/dV. Data related to the wires A and B, data related to the calculation area 130 such as a dielectric constant, and the boundary conditions on the boundary of the calculation area 130 are included in the simulation data received in step S201.

The boundary conditions will be explained. The boundary conditions are set on a boundary and are used for a simulation. The boundary conditions are represented with, for example, values and expressions. The boundary conditions may be fixed, mirror, periodic, transmission, and infinite boundary conditions. The fixed boundary conditions set fixed values for a part or the whole of a boundary. The mirror boundary conditions make a boundary to reflect, for example, ions that reach the boundary. The periodic boundary conditions make, for example, ions moved out of a boundary to reenter from another boundary. The transmission boundary conditions allow, for example, ions to move out of and into a boundary. The transmission boundary conditions may be classified into perfect transmission boundary conditions and partial transmission boundary conditions. The infinite boundary conditions set an infinite distance outside a boundary when considering the behavior of, for example, ions The examples shown in FIGS. 3A and 3B employ the mirror boundary conditions.

In FIG. 3A, the wire-to-wire capacitance value may correctly be calculated if the distance D between the boundary and the wire A is sufficiently long. If the distance D is short, mirror images formed on the outside of the calculation area 130 due to the mirror boundary conditions affect the wires inside the calculation area 130, to hinder a correct computation of the capacitance value. This is because, when the small potential dV to calculate the capacitance value is applied to the wire B, the wire A is affected by all the wire B including a real image and virtual images. This problem is frequently overlooked by the user if the user is unfamiliar with simulations.

Figure 3B:
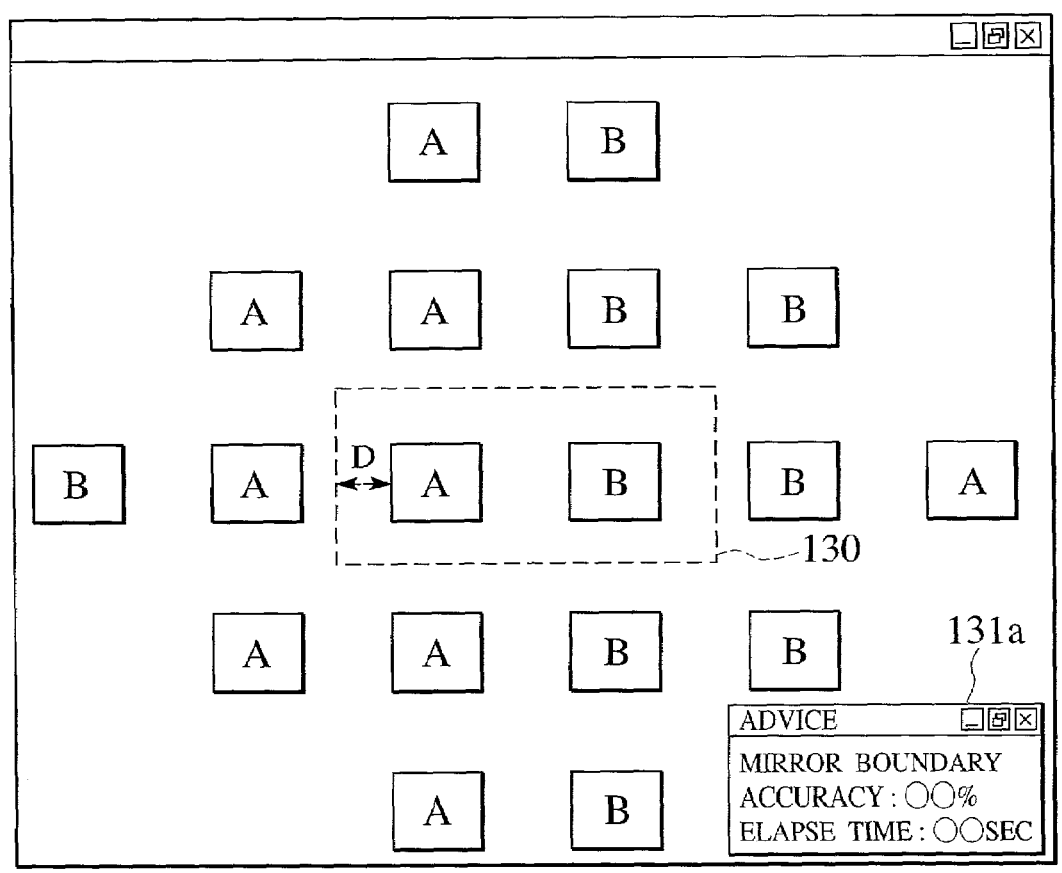
FIG. 3B shows an example of a window provided by the simulation system of FIG. 1 achieving the method of FIG. 2.

To cope with this problem, step S203 displays the virtual images that appear outside the calculation area 130 due to the boundary conditions, as shown in FIG. 3B. The calculation area 130 of FIG. 3B corresponds to that of FIG. 3A. The calculation area 130 includes the real images of the wires A and B. The non-calculation area outside the calculation area 130 includes the virtual images that are formed according to the mirror boundary conditions. The mirror boundary conditions form a virtual wire A on the left side of the calculation area 130. On the left side of this virtual wire A, a virtual wire B is formed due to the real wire B. With these images, the user may easily understand whether or not the capacitance value to be computed is an intended one.

In FIG. 3B, the embodiment displays the mirror images outside the calculation area 130, so that the user may easily grasp the influence of the mirror images. To attract more attention of the user, the wire to which a small potential is applied and the mirror images of this wire may conspicuously be colored or blinked. The simulation system may extract useful information such as a computation accuracy and a computation speed related to the simulation from the database 116 according to the boundary conditions set by the user and display the extracted information in an advice window 131a shown in FIG. 3B.

Figure 4:
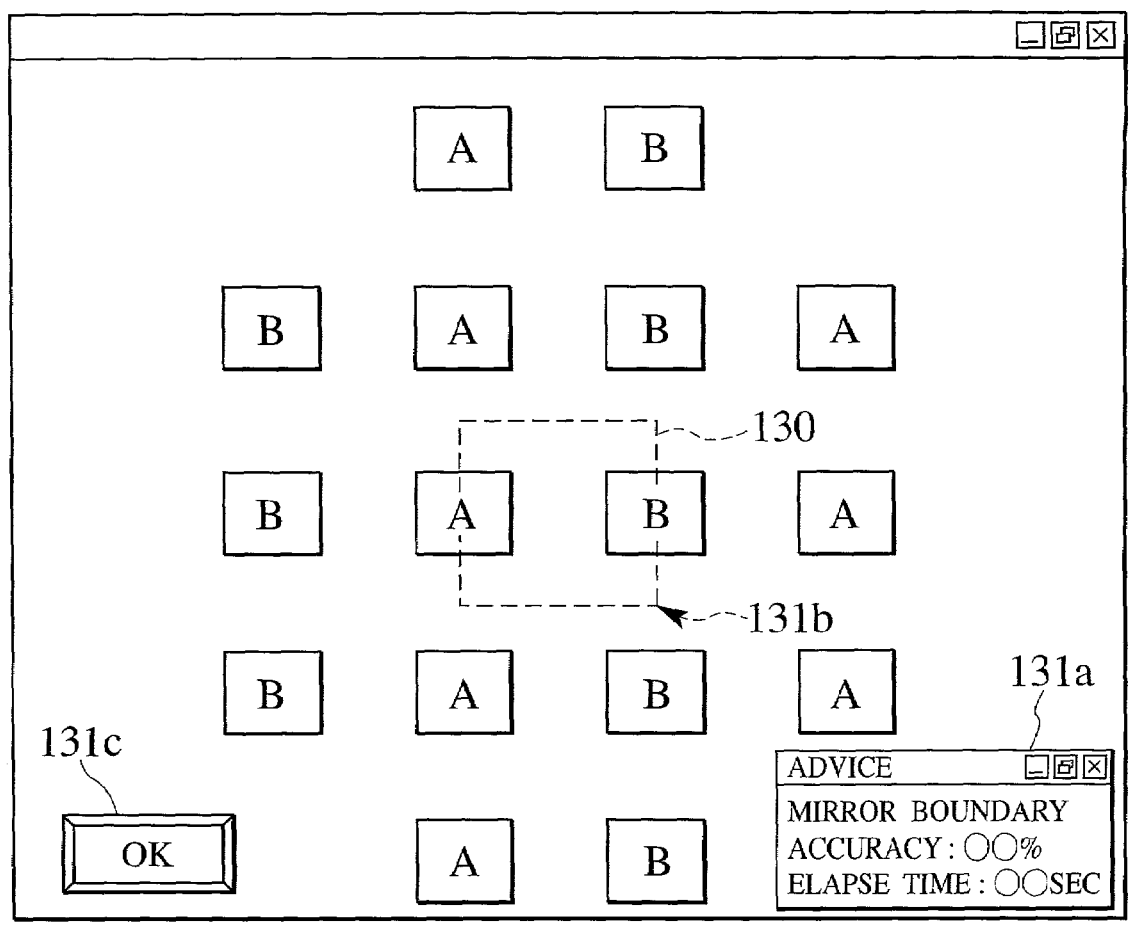
FIG. 4 shows another example of a window provided by the simulation system of FIG. 1 achieving the method of FIG. 2.

FIG. 4 shows another example of a window provided by the simulation system 100. The user of the simulation system 100 is allowed to change the calculation area 130, and the simulation system 100 generates mirror images based on the changed calculation area 130, as shown in FIG. 4. To change the calculation area 130, the user manipulates a pointer 131b with, for example, the mouse. When the user clicks an OK button 131c, the simulation system 100 rearranges the mirror images of the wires A and B. Instead of pushing the OK button 131c, the simulation system 100 may rearrange virtual images in real time in response to the movement of the calculation area 130 manipulated by the user.

After step S203 displays images outside the calculation area 130, the user refers to the displayed images and information and determines, in step S204, whether or not the boundary conditions must be changed. If no change is needed, the user clicks, for example, a simulation execution button with the mouse, to instruct the simulation system 100 to start a simulation. If any change is needed, the user clicks, for example, a boundary condition change button with the mouse. Then, the simulation system 100 executes the next step according to the boundary condition display program 113b.

Figure 5:
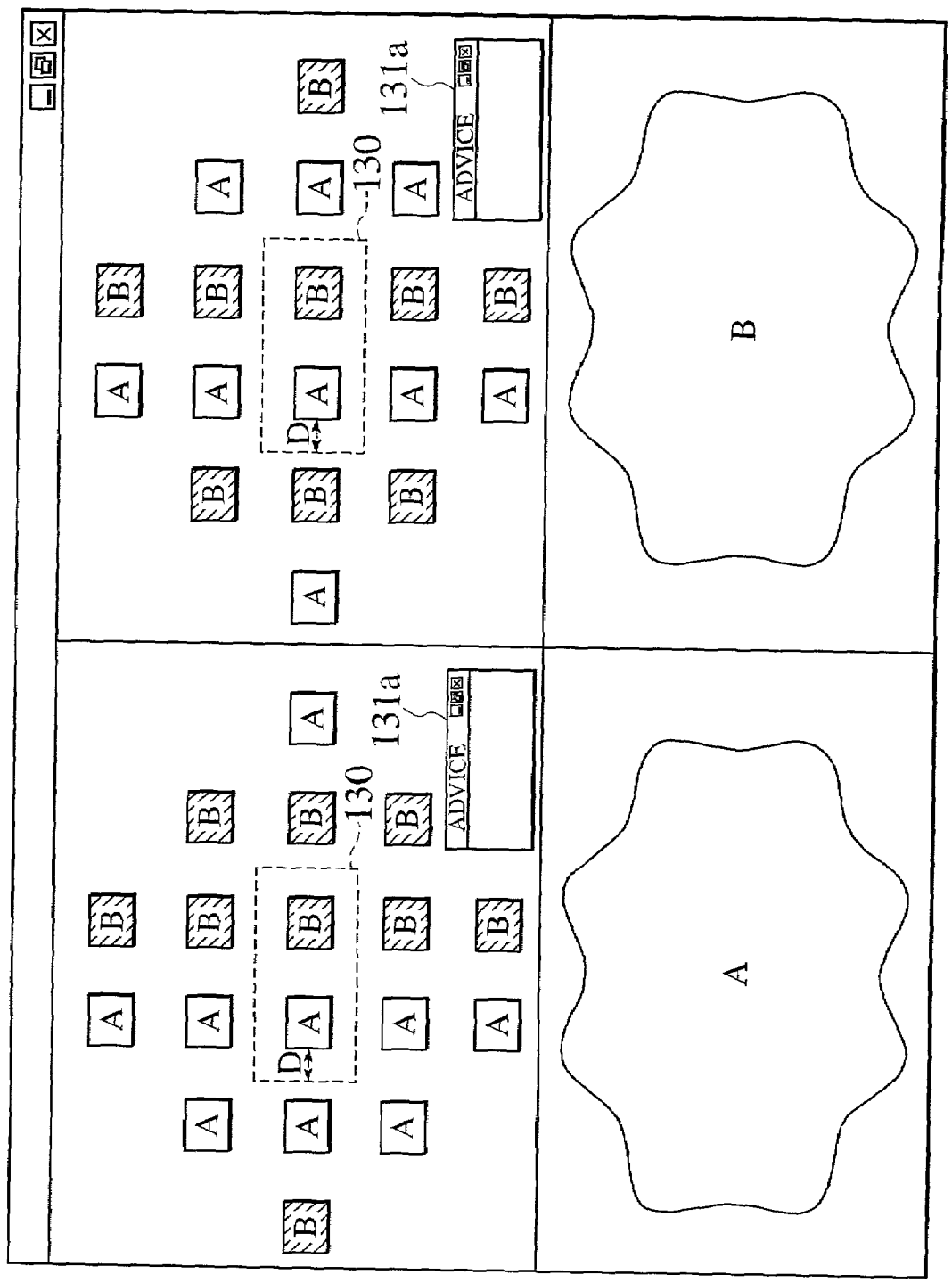
FIG. 5 shows another example of a window provided by the simulation system of FIG. 1 achieving the method of FIG. 2.

In step S205, the simulation system 100 refers to the database 116 and generates virtual images outside the calculation area 130 according to boundary conditions other than those set by the user, and displays the generated images condition by condition as shown in FIG. 5. The images generated in step S205 are prepared by temporarily replacing codes expressing the user-entered boundary conditions with codes expressing other boundary conditions and by executing computations with the replaced codes. The virtual images in FIG. 5 may conspicuously be colored or blinked like the example of FIG. 3B. Advise windows 131a in FIG. 5 are used to display information related to the boundary conditions.

Boundary conditions used to simulate an ion implantation process in semiconductor device manufacturing will be explained. The ion implantation process implants impurities such as ions into, for example, a silicon substrate, an oxide film, or a polysilicon layer. A simulation of the ion implantation process calculates a distribution of ions in a calculation area of a target material made of, for example, silicon or polysilicon according to the acceleration energy, dose, and implantation angle of ions. In practice, ions are emitted from an ion emitting apparatus toward a target such as a wafer. In a simulation, an area in which an ion distribution is calculated is set as a calculation area, and the quantity of ions introduced into a material in the calculation area is calculated according to the paths of ions entering the calculation area. An ion implantation simulation on a two-dimensional structure will be explained with reference to FIGS. 6A to 7.

Figure 6A:
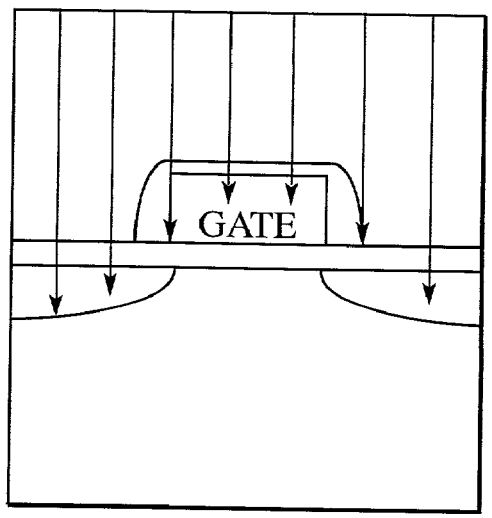
FIGS. 6A, 6B, and 6C show the behavior of ions under various boundary conditions.

FIG. 6A shows a rectangular calculation area and ions entering the area from above the area. The top side of the calculation area serves as a start point of each ion path, and a distribution of ions will correctly be simulated with the left and right sides of the calculation area being provided with any of the mirror, periodic, and transmission boundary conditions.

Figure 6B:
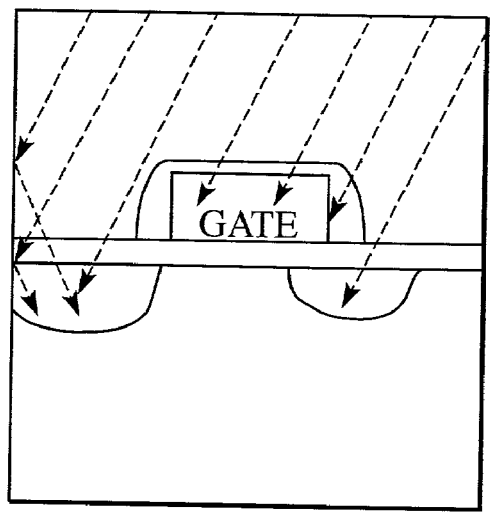

FIG. 6B shows a rectangular calculation area and ions obliquely entering the area. The top side of the calculation area serves as a start point of each ion path. If the left and right sides of the calculation area are provided with the mirror boundary conditions, ions that enter the right side of the calculation area will not be counted in computation. On the other hand, ions that hit the left side of the calculation area are reflected back into the calculation area, to form a part whose ion concentration is higher than a real concentration.

Figure 6C:
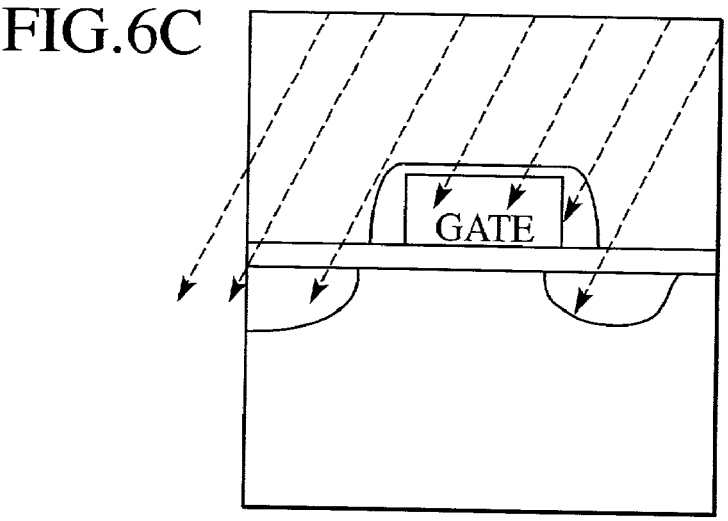

FIG. 6C shows a rectangular calculation area and ions obliquely entering the area. If the left and right sides of the calculation area are provided with the perfect transmission boundary conditions, no ions on the right side of the calculation area will be considered in computation. If the periodic boundary conditions are applied to FIG. 6C, ions that exit from the left side of the calculation area will be reintroduced into the right side thereof at the same coordinate heights, to provide a correct computation result. The periodic boundary conditions, however, are applicable only to a periodic structure.

Figure 7:
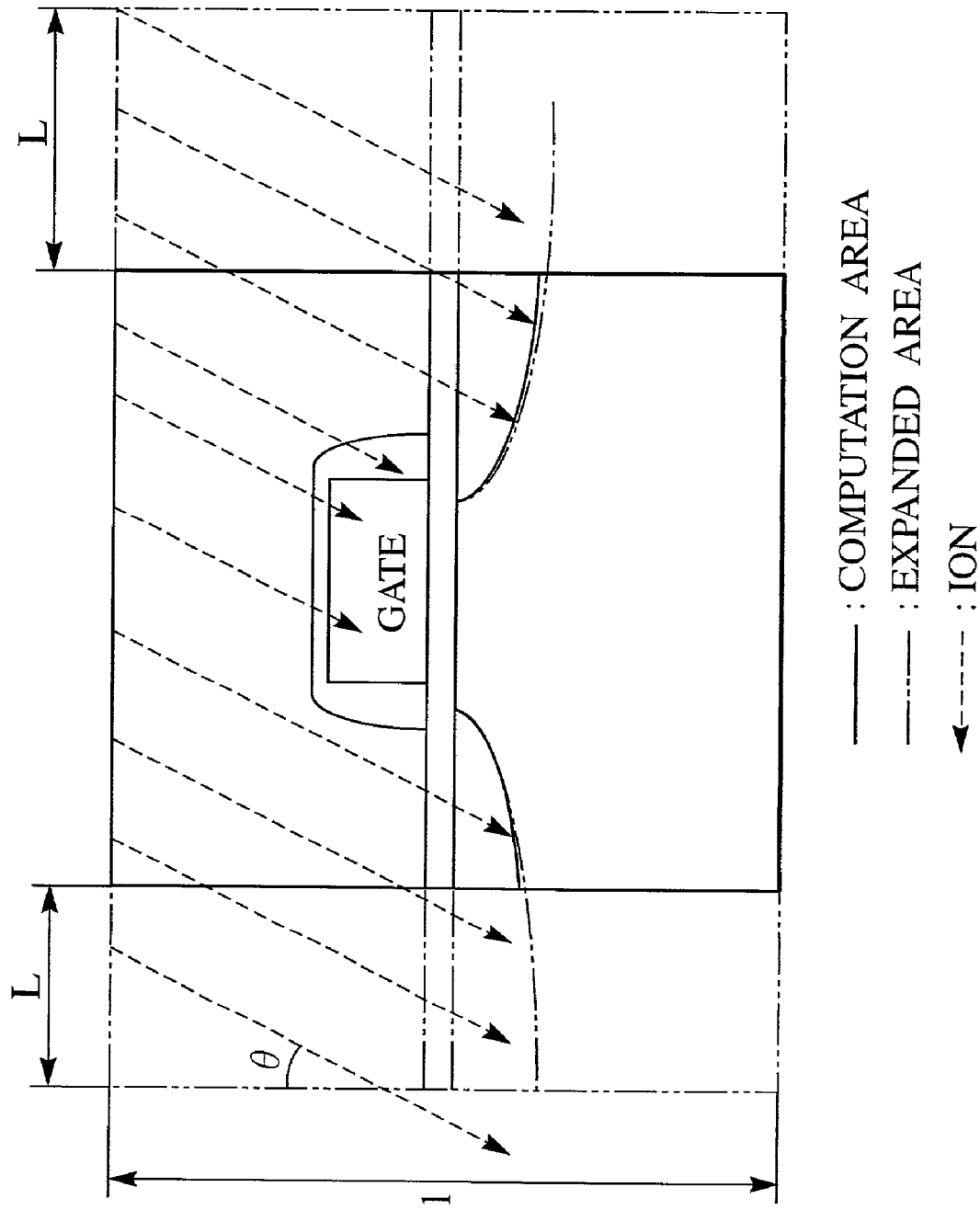
FIG. 7 explains a simulation method according to an embodiment of the present invention.

To cope with these problems, the simulation system 100 expands a calculation area as shown in FIG. 7, if the calculation area is improper for the relatively simple boundary conditions such as the mirror, fixed, and periodic boundary conditions. For the left and right parts of the expanded calculation area, the simulation system 100 sets boundary conditions that involve simple calculations. Namely, the simulation system 100 generates a new calculation area based on an original calculation area, to correctly calculate an external influence on the original calculation area, and displays the new calculation area for the user. In FIG. 7, the original calculation area set for, for example, an ion implantation simulation is expanded by a length L on each side. The length L of each expanded area is expressed as follows:

$$L = l^* \tan \theta$$

where "l" (a lowercase el) is the height of the original calculation area and "θ" is an ion incident angle. If an ion penetrating depth is known, the length L is expressed as follows:

$$L = l^* \tan \theta^* k + m$$

where k is the ratio of the ion entering depth to the height "1" and "m" is a margin. These expressions are useful to properly determine an expansion area, to minimize an increase in a computation time due to the expanded calculation area.

These techniques according to the embodiment of the present invention draw the attention of the user to the boundary conditions. The user may easily understand whether or not an intended simulation result is obtainable. The simulation system 100 may display not only the expanded calculation area but also the influence of the expanded area on the original calculation area. Although this embodiment relates to two-dimensional simulations, the present invention is also applicable to three-dimensional simulations.

In this way, step S205 displays virtual images outside the calculation area 130 according to boundary conditions other than those specified by the user. In step S206, the user determines whether or not required boundary conditions are included in the displayed boundary conditions. If there are, the user employs, for example, the mouse to specify the window in which the required boundary conditions are displayed. According to the specified boundary conditions, the simulation system 100 updates the simulation data in step S208. According to the updated simulation data, the simulation system 100 carries out a simulation in step S209 and provides a simulation result to the output unit 115. The user studies the simulation result and carries out various processes including a semiconductor device designing process accordingly. If there are no required boundary conditions in step S206, the user manually edits the simulation data in step S207 and returns to step S201.

This embodiment asks the user to specify one of the windows displaying various boundary conditions. Instead, the user may specify the four sides of a calculation area and manually set boundary conditions on the four sides, respectively. This enables the user to set required boundary conditions by him or herself. The user may partly set boundary conditions on the sides of a calculation area.

Step S205 may employ a Monte Carlo simulation technique for simulating the behavior of impurities such as ions. This will be explained. The Monte Carlo simulation handles implanted ions as particles and calculates the hitting, scattering, and stopping of the ions with respect to atoms in a target material into which the ions are implanted. In such calculations, ions that enter a calculation area scatter, change directions, and sometimes move out of the calculation area. If calculations are continued outside the calculation area, some ions exited from the calculation area will never return into the calculation area and some will be redirected into the calculation area. The Monte Carlo simulation is capable of correctly perform these calculations even if the target material has an intricate structure. A computation time of the Monte Carlo simulation extends in proportion to the number of particles in the calculation area. If the calculation area is unnecessarily expanded, a very long computation time is needed because a large number of particles will be included in the calculation area.

To cope with this problem, the present invention preliminarily introduces a small number of ions into an expanded calculation area and examines positions where the ions stop. Based on the ion stopped positions, the present invention determines a final expanded calculation area and achieves a Monte Carlo simulation. At this time, a result of the computation made on the small number of preliminarily implanted ions is included in the Monte Carlo simulation, to save a calculation time. For example, about one percent of particles (ions) used for the Monte Carlo simulation may preliminarily be introduced to determine the final expanded calculation area. Only by increasing a total computation time by one percent, this technique provides a correct simulation result.

In this way, the embodiment studies the influence of an expanded calculation area on an original calculation area when simulating an ion implantation process by the Monte Carlo simulation technique. This eliminates simulation errors that may involve repetitions of calculations, and correctly simulates an impurity distribution.

The embodiment mentioned above expands an original calculation area, displays an expanded calculation area, and asks the user to determine a final calculation area. According to an embodiment of the present invention, the simulation system 100 may automatically expand an original calculation area, count the number of particles that exit from and return to the expanded calculation area, carry out statistical calculations, and according to a result of the statistical calculations, check to see if the influence of the expanded calculation area on the original calculation area is below a predetermined level. If the influence is below the predetermined level, the simulation system 100 starts a final simulation. This is a technique to automatically and efficiently perform a simulation.

The embodiments mentioned above locally input and output data. According to an embodiment of the present invention, the data input and output may be achieved between remote locations through an electronic network. For example, a LAN may be employed to input and output simulation data, simulation results, and boundary conditions.

As explained above, the simulation system 100 computes and displays a finite calculation area used for a simulation and the influence of boundary conditions on a simulation result. With the simulation system 100, even a user unfamiliar with simulations can determine boundary conditions suitable for simulating physical quantities related to a semiconductor device to develop.

The simulation system 100 allows the user to properly change simulation data while examining the influence of boundary conditions on a calculation area and the effectiveness of the calculation area. With the simulation system 100, the user can efficiently execute simulations. When applied to process and device simulations for designing a semiconductor device, the simulation system 100 greatly reduces labor and time needed for the simulations. With the simulation system 100, the user can examine the influence of boundary conditions on a simulation, and according to a result of the examination, can correct simulation data to execute the simulation. With the simulation system 100, the user can correctly evaluate boundary conditions set for a simulation and can set a proper calculation area that provides a correct simulation result.

The simulation program according to the embodiment is applicable to process and device simulations in designing a semiconductor device. With the program, the user can properly evaluate boundary conditions set for the simulations and correctly design the semiconductor device. The simulation program greatly reduces the labor and time of semiconductor device designing. The simulation program enables even a user unfamiliar with simulations to easily and correctly carry out simulations with proper boundary conditions.

(Semiconductor Device Manufacturing Method)

Figure 8:
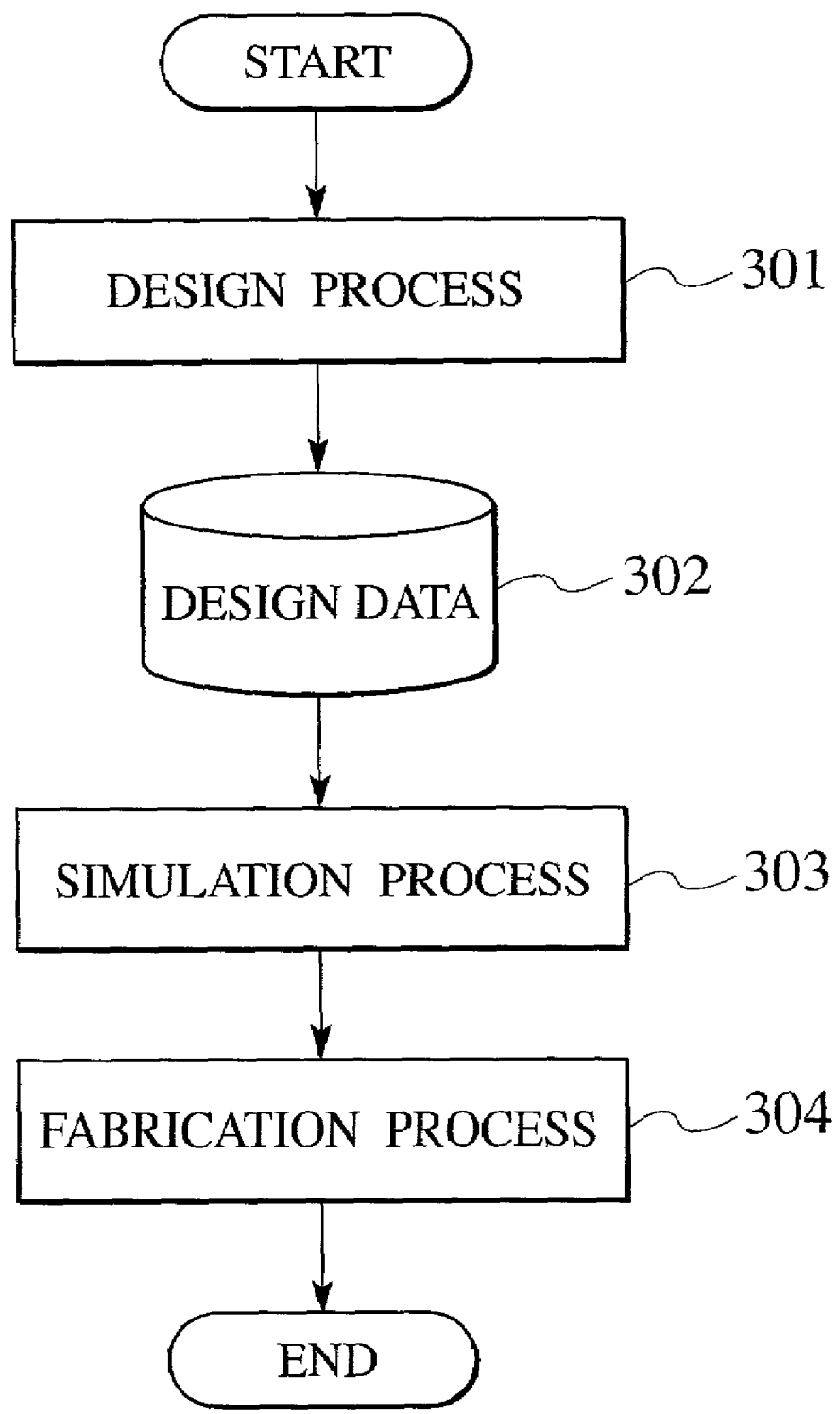
FIG. 8 is a flowchart showing a semiconductor device manufacturing method according to an embodiment of the present invention.

FIG. 8 is a flowchart showing a semiconductor device manufacturing method according to an embodiment of the present invention. Step S301 is a design process to provide design data 302 related to the semiconductor device. According to the design data 302, step S303 carries out a simulation to evaluate the electric characteristics and manufacturing processes of the semiconductor device and determine physical quantities concerning the semiconductor device. The simulation is carried out to improve the characteristics of the semiconductor device. The simulation employs the simulation system 100 mentioned above, to compute the influence of boundary conditions contained in simulation data on a calculation area set for the simulation. According to the computed influence of boundary conditions, final boundary conditions are determined. According to the final boundary conditions, a simulation is carried out to determine physical quantities concerning the semiconductor device. According to the physical quantities, step S304 manufactures the semiconductor device. In this way, the semiconductor device manufacturing method according to the embodiment involves the simulation process that employs the simulation system 100 of the present invention to easily and correctly carry out a simulation with boundary conditions. The semiconductor device thus formed has improved characteristics and precision.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A method of simulation for designing a semiconductor device with simulation data of the semiconductor device, comprising:
    determining whether or not the simulation data includes boundary conditions set for a boundary of a calculation area set for the simulation;
    computing an influence of the boundary conditions on an inside of the calculation area if the simulation data include the boundary conditions;
    displaying the influence of the boundary conditions on the inside of the calculation area, said displaying operation comprising:
        if the simulation data includes the boundary conditions, generating mirror images outside the calculation area according to the boundary conditions; and
        displaying the mirror images, as well as real images included in the calculation area;
        prompting to enter an instruction whether or not the boundary conditions are changed; and
        if an instruction to make no change in the boundary conditions is entered, carrying out the simulation with the simulation data.

2. The method as claimed in claim 1, further comprising, after prompting to enter an instruction:
    if an instruction to make a change in the boundary conditions is entered, generating mirror images outside the calculation area according to boundary conditions other than the boundary conditions included in the simulation data;
    displaying the mirror images, as well as real images included in the calculation area;
    prompting to enter an instruction whether or not the boundary conditions used to generate the mirror images are adopted; and
    if an instruction to adopt the boundary conditions used to generate the mirror images is entered, carrying out the simulation by employing the adopted boundary conditions.

3. The method as claimed in claim 2, further including:
    computing and displaying an influence of other boundary conditions on the calculation area.

4. The method as claimed in claim 1, further comprising, after prompting to enter an instruction:
    if an instruction to make a change in the boundary conditions is entered, expanding the calculation area and providing data concerning the expanded calculation area.

5. The method as claimed in claim 1, wherein:
    the boundary of the calculation area is changeable.

6. The method as claimed in claim 1, wherein computing and displaying the influence of the boundary conditions includes:
    computing and displaying information about accuracy and speed of the simulation to be carried out with the simulation data including the boundary conditions.

7. A computer program product for simulation for designing a semiconductor device with simulation data of the semiconductor device, comprising:
    a determining module configured to determine whether or not the simulation data includes boundary conditions set for a boundary of a calculation area set for the simulation if the simulation data includes the boundary conditions;
    a computing module configured to compute an influence of the boundary conditions on an inside of the calculation area if the simulation data include the boundary conditions;
    a displaying module configured to display the influence of the boundary conditions on the inside of the calculation area, said displaying module comprising:
        a generating module configured to generate images outside the calculation area according to the boundary conditions if the simulation data includes the boundary conditions; and
        an image displaying module configured to display the mirror images, as well as real images included in the calculation area;
        a prompting module configured to prompt to enter an instruction whether or not the boundary conditions are changed; and
        a simulation module configured to carry out the simulation with the simulation data if an instruction to make no change in the boundary conditions is entered.

8. The program product as claimed in claim 7, further comprising, after prompting module:
    a generating module configured to generate mirror images outside the calculation area according to boundary conditions other than the boundary conditions included in the simulation data if an instruction to make a change in the boundary conditions is entered;
    a displaying module configured to display the mirror images, as well as real images included in the calculation area;
    a prompting module configured to prompt to enter an instruction whether or not the boundary conditions used to generate the mirror images are adopted; and
    a simulation module configured to carry out the simulation by employing the adopted boundary conditions if an instruction to adopt the boundary conditions used to generate the mirror images is entered.

9. The program product as claimed in claim 8, further comprising:
    a computing and displaying module configured to compute and display an influence of other boundary conditions on the calculation area.

10. The computer product as claimed in claim 7, further comprising, after prompting module:
    an expanding module configured to expand the calculation area and providing data concerning the expanded calculation area if an instruction to make a change in the boundary conditions is entered.

11. The program product as claimed in claim 7, wherein:
    the boundary of the calculation area is changeable.

12. The program product as claimed in claim 7, wherein displaying module includes:
  displaying information about accuracy and speed of the simulation to be carried out with the simulation data including the boundary conditions.

13. A semiconductor device manufacturing method, comprising:
  designing a semiconductor device;
  outputting design data of the semiconductor device;
  simulating the design data of the semiconductor device employing a simulation data in connection with the semiconductor device, the simulating comprising:
  determining whether or not the simulation data includes boundary conditions set for a boundary of a calculation area set for the simulation;
  computing an influence of the boundary conditions on an inside of the calculation area if the simulation data includes the boundary conditions;
  displaying the influence of the boundary conditions on the inside of the calculation area, said displaying operation comprising:
    if the simulation data includes the boundary conditions, generating mirror images outside the calculation area according to the boundary conditions; and
    displaying the mirror images, as well as real images included in the calculation area;
    prompting to enter an instruction whether or not the boundary conditions are changed; and
    if an instruction to make no change in the boundary conditions is entered, carrying out the simulation with the simulation data; and
  fabricating the semiconductor device according to the design data.

* * * * *